United States Patent Office 2,875,253
Patented Feb. 24, 1959

2,875,253
TELOMERIZATION WITH FLUOROBROMO-ALKANES

William S. Barnhart, Cranford, N. J., assignor, by mesne assignments, to Minnesota Mining and Manufacturing Company, St. Paul, Minn., a corporation of Delaware No Drawing. Application April 6, 1953
Serial No. 347,186

35 Claims. (Cl. 260—653)

This invention relates to low molecular weight, fluorine containing polymers or telomers and their preparation. In one aspect this invention relates to a method for telomerization of fluorine-containing monomers. In another aspect this invention relates to a method of producing a fluorine-containing polymer or telomer in the liquid to wax range useful as lubricants, plasticizers, intermediate reactants, etc.

In recent years, there has been considerable interest in polymers formed from perhalogenated olefins, such as trifluorochloroethylene and tetrafluoroethylene. They have a high degree of chemical and thermal stability and are of special interest because of their unusual resistance to chemical attack by most reagents. However, when perhalogenated olefinic monomers are polymerized in the presence of a catalyst alone, the product is usually a high molecular weight solid or plastic which must undergo thermal cracking to effect the production of valuable low molecular weight liquids, oils, greases, and waxes. These low molecular weight pyrolytic products must be stabilized with $CoF_3$, filtered and distilled before a stable end product is attained. The utility of the products thus obtained is known in the art which shows their use as lubricants. The obviously long and costly method of making such inert lubricants containing fluorine results in a high cost, low yield product.

It is, therefore, an object of the present invention to provide a more economical method for the preparation of low molecular weight olefin derived polymers containing fluorine.

It is another object of the invention to provide a method for the preparation for liquid, oil, grease, and wax-like polymers having halogenated terminal groups one of which contains at least one fluorine atom.

Another object of this invention is to provide new and novel polymers or telomers which can be directly stabilized, if desired, to yield stable polymeric oils.

A further object of this invention is to provide a new telomerization process involving either homotelomerization or cotelomerization.

It is still another object of this invention to provide new and novel intermediate products from which valuable final products, such as known olefin derived compounds containing fluorine, can readily be obtained.

It is still a further object of this invention to provide a process which produces telomers or polymers of improved quality in higher yields.

Other objects and advantages of the present invention will become apparent to those skilled in the art from the following detailed description.

The above objects are achieved by homotelomerizing an olefinic monomer containing fluorine, or by cotelomerizing such a monomer with another cotelomerizable olefin, in the presence of a peroxy type polymerization promoter, effective under the conditions of telomerization, such as an organic peroxide or inorganic peroxy compound, and an incompletely fluorinated fluorobromoalkane telogen having the formula:

$$C_mFX_aY_bZ$$ 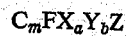

wherein X is bromine, fluorine, or chlorine, Y is a hydrogen fluorine, chlorine, or bromine, Z is bromine and wherein Z represents a most electropositive atom in the telogen; $m$ is an integer having a value from one to three, $a$ represents the number of X atoms and $b$ represents the number of Y atoms, and $a+b$ have a value equivalent to $2m$. The preferred telogens constitute the methane class of the above formula where $m$ is equal to one and $a$ plus $b$ is equal to two.

These telogens supply the terminal groups for the telomeric chain, and control the telomerization by limiting the free radical propagation reaction. The latter phenomenon is illustrated by the observation that with varying amounts of telogen, the telomeric product may be obtained primarily as a liquid, oil, grease, or wax. Depending upon the ultimate use, the product is utilizable without further treatment or it may be treated with another reactive agent to produce a final product useful as a lubricant and plasticizer for solid fluorine-containing high molecular weight polymers. For example, the product of this invention may be reacted with fluorine to produce a highly stable oil, useful for many purposes as hereinafter described.

One particular advantage of the product of the present invention is that one of the terminal groups present readily reacts with reactive reagents under appropriate conditions while the other group containing fluorine is much more unreactive. This arrangement provides higher and more efficient product conversion to selected derivatives.

The telomerization reaction occurs essentially as shown below in a typical reaction using trifluorochloroethylene as the monomer and difluorobromochloromethane as the telogen in the presence of a promoter, such as benzoyl peroxide or potassium persulfate:

The telomers, formed by the telomerization of fluorine containing olefinic compounds with fluorobromoalkyl compounds of the type described, are new to the art. They have the general formula:

$$C_mFX_aY_b(A)_nZ$$ 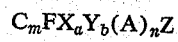

wherein X is bromine, fluorine and chlorine, Y is hydrogen, fluorine, chlorine, and bromine; $m$ is an integer representing a value from one to three; $a+b$ have a value equivalent to $2m$; Z is bromine, and wherein Z represents a most electropositive atom of the terminal groups; $n$ indicates the number of monomer units and is an integer greater than one and not greater than one hundred; preferably a value between six and fifty and each A is a monomer unit selected from the group consisting of an olefin containing fluorine and a cotelomerizable comonomer and in which at least one A unit, and preferably at least four A units are olefins containing fluorine, preferably partially or totally fluorinated ethylene monomer units. In most instances, the ratio of the fluorine containing monomer to comonomer is 1:2 to 4:1 (A units). These telomers may be useful as intermediates in the production of other valuable compounds. For example, the telomer may be reacted with a fluorinating agent to directly produce a highly chemical and physically stable oil, grease, or wax-like polymer having the general formula as above defined:

$$C_mF(F)_{2m}(A)_nF$$

Known fluorinating agents include 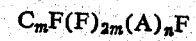

SbF$_5$ and SbF$_3$, however, any other suitable fluorinating agent may also be used without departing from the scope of this invention. The resulting telomeric halocarbons containing fluorine may be fractionated by distillation to separate the constituents. Typical examples of suitable telogens comprise CF$_3$BR, CF$_2$BrCl, CCl$_2$BrF, CF$_2$Br$_2$, C$_2$F$_3$ClBr$_2$, C$_2$F$_5$Br, C$_2$F$_3$ClBrH, C$_2$F$_4$BrCl, C$_3$F$_6$BrH, C$_3$F$_4$Br$_2$Cl$_2$, C$_3$F$_4$Br$_4$ and C$_3$F$_6$Br$_2$. The preferred telogens are those comprising CF$_2$BrCl and CF$_2$Br$_2$. The compounds CF$_2$BrCl and CF$_2$Br$_2$ are conveniently prepared by known methods, such as bromination of CF$_2$HCl (Freon 22).

Monomers which undergo telomerization are those containing the

group; those monomers which homotelomerize difficulty may be cotelomerized with other more readily polymerizable monomers. The olefinic compounds, which may be used as the fluorine-containing monomers in the present invention, are any telomerizable compound containing a double bond between two carbon atoms and at least one fluorine atom; the other atoms being selected from the group consisting of the halogens, hydrogen, and carbon.

When the telomer is obtained by homotelomerization, each A in the preceding formula represents the same monomer unit throughout; and when the telomer is obtained by cotelomerization, A represents different monomer units wherein at least one is a monomer unit containing fluorine. The telomerization conditions are essentially the same for homo and cotelomerization, therefore, the term telomerization is meant to include both homo and cotelomerization unless otherwise indicated.

The present invention is particularly applicable to the homotelomerization of partially halogenated hydrocarbon olefins containing fluorine, such as vinyl fluoride, fluoroprene, trifluoroethylene, vinylidene fluoride, and fluorinated propenes, butenes, butadienes and amylenes; and of fluorohaloolefins, such as monofluoromonochloroethylene, difluoromonochloroethylene, dichloromonofluoroethylene, and partially halogenated propenes, butenes, butadienes and amylenes containing both fluorine and chlorine. The invention is also applicable to the completely halogenated olefins, such as the perfluorochloroolefins and perfluoroolefins; for example, trifluorochloroethylene, difluorodichloroethylene, dichloroperfluorobutadiene, tetrafluoroethylene, perfluoropropene, dichloroperfluorobutene, perfluorobutadiene, and perfluoroamylene. This invention, however, also contemplates the homotelomerization of various other olefins of the above classes or groups containing fluorine and bromine or iodine without departing from the scope of the invention. The preferred olefins are the perhalomonoolefins having not more than 5 carbon atoms per molecule, and having at least one fluorine atom per number of carbon atoms.

As previously mentioned, the invention applies to the cotelomerization of the above monomers as well as to their homotelomerization. A typical illustration is the cotelomerization of trifluorochloroethylene and tetrafluoroethylene; however, the comonomers are not necessarily selected from the group of olefins containing fluorine. The comonomers may be any unsubstiuted hydrocarbon olefin, either alicyclic or acyclic, such as ethylene, propene, butene, amylene, and butadiene; any partially halogenated hydrocarbon olefins, either alicyclic or acyclic, for example, the partially chlorinated olefins, such as vinyl chloride, vinylidene chloride, trichloroethylene, chloroprene, and chlorinated propenes, butenes, butadienes, and amylenes; any perhalogented olefins, such as the perchlorinated olefins of the above, e. g., tetrachloroethylene, and perchloropropene; and any copolymerizable olefin containing oxygen and/or nitrogen, such as methyl methacrylate, vinyl acetate, fluoroacrylates, and fluorinated acrylonitrile. The invention also includes as comonomer olefins of the above, substituted with aromatic and halogenated aromatic radicals, and isomers of the above compounds.

The telomers resulting from the cotelomerization of an olefinic monomer containing fluorine and a comonomer of the type described above, in the presence of a suitable promoter and telogen, are also new to the art.

The telomerizations in this invention are conducted in the presence of 0.05 to 10 mol percent of a peroxy type polymerization promoter, such as organic peroxides comprising benzoyl peroxide, chlorobenzoyl peroxide, lauroyl peroxide, tertiary butylhydroperoxide, acetyl peroxide, trichloroacetyl peroxide, fluorochloropropionyl peroxide, chloroacetyl peroxide and propionyl peroxide; or inorganic peroxy compounds comprising the alkali metal persulfates, perborates, and percarbonates; hydrogen peroxide, ammonium persulfate, and perphosphoric acid. The invention also contemplates the use of many other suitable polymerization promoters known in the art. In general, the inorganic peroxy compounds are used in aqueous systems with a reducing agent, such as an alkali metal bisulfite and hydrosulfite, e. g., sodium bisulfite, and, if desired, accelerators, such as iron sulfate and manganese sulfate, which provide an appropriate concentration of metal ion. A suitable aqueous system contains 0.5 mol percent potassium or ammonium persulfate, a 3:1 volume ratio of water to monomer, an equimolar percent sodium bisulfite and 100 to 200 p. p. m. of iron ion.

The fluorinated telomers may be prepared by the telomerization of the monomer, or monomer and comonomer, at temperatures from about 0° C. to about 200° C., at pressures sufficient to maintain liquid phase conditions and in the presence of a suitable promoter and telogen. The process may be carried out in either a batchwise or continuous manner, and in either an aqueous or non-aqueous system. Halogen exchange may occur in the product, for example, a halogen of the monomer unit may be replaced with another halogen from the telogen. The molecular weight of the product obtained, within the range of liquids, oils, greases, and waxes, is partially dependent upon the amount of telogen used, for, as the amount of telogen is progressively increased, the molecular weight of the product will decrease; conversely, as the amount of telogen is decreased, the molecular weight of the product will accordingly increase. The various telomer fractions in the product can be separated by such methods as distillation, solvent extraction, crystallization or any other suitable or convenient method.

More particularly, fluorinated telomers may be conveniently prepared by the telomerization of a fluorine containing olefinic monomer in the presence of a fluorobromoalkane, preferably a perfluorobromoalkane, such as CF$_2$BrCl or CF$_2$Br$_2$ and a suitable peroxy type promoter, such as potassium persulfate in combination with a sufficient amount of water about 1 to 10 volumes of water per total volume of monomer and telogen. The mole ratio of telogen to monomer is generally from about 10:1 to about 1:2, preferably from about 1:1 to about 4:1. In cases where an autoclave is used as the reactor, addition of monomer is effected by pressurizing the monomer into the autoclave; or by cooling the monomer to a temperature below its boiling point, so that it may be poured, as a liquid, into the cooled autoclave. The telomerization is conducted at temperatures between about 0° C. and about 200° C., preferably between about 25° C. and about 150° C., for a period of time up to about 100 hours, preferably from about one to about ten hours, or until the reaction has progressed the desired extent. In the autoclave type of operation, a maximum autogenous pressure is reached which subsequently subsides as the reaction proceeds and finally remains constant; the latter condition indicates that the telomerization has proceeded to a state of approximate completion. During the reaction some type of agitation is desirable but not essential, such as stirring with a motor driven propeller. After the telomerization has reached the desired extent, it is beneficial to cool the reaction chamber before venting off the gaseous materials which contain unreacted monomer. Quantity yields of product ranging from about 50 to about 90 percent by weight based on monomer charged may be obtained by this method.

Although the batch system just described shows high yields, it is possible to obtain superior yields from a continuous system, which comprises metering promoter, telogen and monomer, either separately or together, into a continuous pipe coil or elongated reaction vessel. The system is heated or cooled to maintain the required temperature by means of suitable heat exchangers and is maintained under a uniform pressure, sufficient to retain the reactants in the liquid phase during the run. The total pressure, however, will depend upon the vapor pressures of the respective ingredients charged. A pressuring gas, such as nitrogen, may be used, if desired. Sufficient residence time is provided to obtain the desired products by controlling the flow rate of the reactants through the reactor. Yields ranging from about 30 to about 90 percent by weight based on monomer charged may be realized by this method.

Some distinct advantages of this invention are illustrated in the following procedure, which entirely eliminates the necessity for cracking to obtain low molecular weight products by avoiding the initial formation of high molecular weight polymers.

As a typical example, fluorobromoalkane telogen, preferably $CF_2BrCl$ or $CF_2Br_2$, and a peroxy promoter, such as an organic peroxide or inorganic peroxy promoter is charged to a polymerization bomb. An ethylenic olefin containing fluorine is pressurized into the bomb in a mol ratio amount of 1:3 with the telogen. The bomb is then sealed, heated to a temperature of about 100° C. and agitated. The temperature is maintained for a period of about four or five hours, after which the bomb is cooled to about 25° C. and the unreacted monomer and other gases are vented off before pouring out the liquid product, consisting of the liquid, oil, grease, and wax-like telomers. The constituents or constituent fractions of this liquid product may be separated by fractional distillation and the resulting telomers stabilized with $CoF_3$, $ClF_3$, $F_2$, $SbF_5$, $SbF_3$ or any other suitable fluorinating agent, if so desired.

The following examples illustrate the typical embodiments of this invention and are offered as a better understanding of the invention but should not be construed as unnecessarily limiting to the invention. The percentages of the promoter and of the product yield are based on the weight of monomer charged.

*Example 1*

One and eight tenths moles of $CBrClF_2$ and three percent by weight of benzoyl peroxide were charged into a stainless steel bomb having stainless steel fittings including a union, a quarter-inch valve and a 500 pounds per square inch Hoke gauge. The bomb was attached to an agitator of an ordinary washing machine in which steam coils were mounted for the purpose of heating the water bath to the desired temperature. The apparatus was flushed with nitrogen to remove any residual oxygen present. An amount (0.6 mole) of trifluorochloroethylene monomer ($CF_2$=$CFCl$), after being cooled to a temperature of −25° C., was added to the cooled autoclave. The resulting mixture had a 1:3 mol ratio of monomer to telogen. The bomb was sealed and placed in the washing machine where it was agitated and heated at a temperature of 99° C. for a period of four or five hours. The bomb was then cooled to 25° C. and the unreacted gases were vented before pouring out the liquid product, which amounted to a fifty-five percent yield by weight.

Fractional distillation, up to a temperature of 230° C. and under 0.5 mm. pressure, resulted in the recovery of oil, grease, and wax-like polymer fractions. The product of this example had the general formula $$CF_2Cl(C_2F_3Cl)_nBr$$

where $n$ varied from 2 to 100, with the major proportion of the product having an $n$ of 6 to 50.

*Example 2*

Into a nitrogen flushed apparatus, such as described in Example 1, one and twenty-eight hundredths moles of dibromodifluoromethane ($CF_2Br_2$) and three percent by weight of benzoyl peroxide were charged as telogen and promoter. An amount (0.43 mole) of trifluorochloroethylene monomer ($CF_2$=$CFCl$), representing a 1.3 mol ratio with the telogen, was poured, after being cooled to a temperature below its boiling point, into the cooled autoclave. The bomb was sealed and placed in the washing machine where it was heated and agitated for a period of four or five hours, at a temperature of about 99° C. During this time the pressure rose, then began to drop. When the autogenous pressure ceased to drop and remained constant, the bomb was cooled to room temperature and the gases were vented before the liquid product, containing liquid, oil, grease, and wax-like polymers, was poured out in a seventy-five percent yield by weight. Simple distillation served to separate the various constituents in the liquid product. The product of this example had the general formula $$CF_2Br(C_2F_3Cl)_nBr$$

with a major proportion of the product having an $n$ from 6 to 50.

*Example 3*

In a steel bomb, such as described in the preceding example, 1 mole of trifluorochloroethylene monomer, 3 moles of carbon tetrafluoride and 0.45 g. of benzoyl peroxide were sealed under high pressure. The experiment was conducted for about ten hours at 75° C. During this period of time it was observed that the autogenous pressure failed to decrease and therefore it was concluded that the constituents remained unreacted in the system. It was further postulated that carbon tetrafluoride, possessing an extremely high degree of stability, failed to provide the necessary terminal groups, which the other fluorinated alkanes produce, and which make the telomerization possible. Carbon tetrafluoride was therefore discarded as an unsuitable telogen in this invention.

*Example 4*

Two percent by weight of potassium persulfate is dissolved in three hundred and fifty milliliters of water, based on 10 volumes of water per total volume of monomer plus telogen, and the solution added to one and five tenths moles of dibromodifluoromethane ($CF_2Br_2$) in a stainless steel bomb from which oxygen has been removed by flushing with nitrogen. An amount of trifluorochloroethylene monomer ($CF_2$=$CFCl$), five tenths of a mole, is pressurized into the steel bomb and the system is closed. The autoclave is then heated and agitated for a period of four or five hours at a temperature of 100° C. After the reaction has proceeded to the desired extent, the bomb is cooled to room temperature and the gases vented before the two phase liquid product is poured out with a seventy-five percent yield by weight. The organic phase is separated from the aqueous material, dried and finally distilled to obtain the liquid, oil, grease, and wax-like telomers of the formula $$CF_2Br(C_2F_3Cl)_nBr$$

wherein $n$=2 to 100.

To a large extent the telomerization conditions of temperature, pressure, concentration and residence time will depend on the olefin, or olefins, being telomerized and the technique used. For example, with perfluorochloroethylenes and perfluoroethylenes, temperatures between about 80° C. and 120° C. are most satisfactory. In a continuous system somewhat shorter residence times may be used than in a batch system, owing to the recycle of unreacted monomer. In autogenous batch type systems the residence time is about two to six hours, depending on the monomer used, and may be as short as ten minutes without departing from the scope of this invention.

The products of this invention have a wide chemical and commercial application. Some of their foremost utilities include their use as plasticizers for other polymers, such as the plastic polymer of trifluorochloroethylene, lubricants, insulating compositions, such as electrical potting compounds and transformer dielectric liquids, coating material, heat transfer media, hydraulic liquid, quenchers for fire extinguishing, and intermediates in the production of many valuable chemicals.

Having thus provided a description of my invention, including specific examples thereof, it should be understood that no undue limitations or restrictions are to be imposed by reason thereof and various alterations and modifications may become obvious to those skilled in the art without departing from the scope thereof.

Having described my invention, I claim:

1. A process for the production of low molecular weight bromine- and fluorine-containing telomers containing a plurality of monomer units, which comprises telomerizing a fluorine-containing olefin in the presence of a peroxy compound as a polymerization promoter and a fluorobromoalkane.

2. A process for the production of low molecular weight fluorohalotelomers containing a plurality of monomer units, which comprises telomerizing a perfluorohaloolefin in the presence of a peroxy compound as a polymerization promoter and a perfluorobromohaloalkane.

3. The process of claim 2, in which said perfluorohaloalkane is difluorobromochloromethane.

4. The process of claim 2, in which said perfluorohaloalkane is trifluorodibromochloroethane.

5. The process of claim 2, in which said perfluorohaloalkane is difluorodibromomethane.

6. The process of claim 2, in which said perfluorohaloalkane is dichlorobromofluoromethane.

7. The process of claim 2, in which said perfluorohaloalkane is pentafluorobromoethane.

8. A process for the production of low molecular weight bromine- and fluorine-containing telomers containing a plurality of monomer units, which comprises telomerizing an olefin containing fluorine at a temperature between about 0° C. and about 200° C. for a period of time between about ten minutes and about one hundred hours, in the presence of a peroxy compound as a promoter which is effective under the conditions of telomerization, and a fluorobromoalkane.

9. The process of claim 8, in which the mol ratio of telogen to monomer is between about 10:1 and about 1:2.

10. The process of claim 8, in which said fluorine-containing olefin is trifluorochloroethylene.

11. The process of claim 8, in which said fluorine-containing olefin is perfluorobutadiene.

12. The process of claim 8, in which said fluorine-containing olefin is trifluoroethylene.

13. The process of claim 8, in which said fluorine-containing olefin is perfluoropropene.

14. The process of claim 8, in which said fluorine-containing olefin is tetrafluoroethylene.

15. The process of claim 8, in which said peroxy type telomerization promoter is benzoyl peroxide.

16. The process of claim 8, in which said peroxy type telomerization promoter is acetyl peroxide.

17. The process of claim 8, in which said peroxy type telomerization promoter is potassium persulfate.

18. The process of claim 8, in which said peroxy type telomerization promoter is hydrogen peroxide.

19. The process of claim 8, in which said peroxy type telomerization promoter is ammonium persulfate.

20. The process of claim 8, in which the temperature is between about 25° C. and about 150° C. and the period of time between about one and ten hours.

21. A process for the production of low molecular weight bromine- and fluorine-containing telomers containing a plurality of monomer units which comprises cotelomerizing an olefin containing fluorine and another olefinic compound, at a temperature between about 0° C. and about 200° C., for a period of time between about ten minutes and about one hundred hours in the presence of a peroxy compound as a telomerization promoter and a fluorobromoalkene, in proportions of between about 10:1 and about 1:2 mol ratio with the monomer.

22. The process of claim 21, in which the comonomers are trifluorochloroethylene and vinylidene fluoride.

23. The process of claim 21, in which the comonomers are tetrafluoroethylene and ethylene.

24. The process for the production of low molecular weight fluorine-containing telomers containing a plurality of monomer units, which comprises homotelomerizing trifluorochloroethylene at a temperature between about 80° C. and about 120° C., for a period of time between about one hour and ten hours, in the presence of 1 to 10 volumes of water per total volume of monomer and telogen, potassium persulfate as a promoter, and difluorodibromomethane as a telogen, the telogen being in a mol ratio of between about 1:1 and about 4:1 with the monomer.

25. A low molecular weight bromine- and fluorine-containing telomer having the general formula:

$$C_mFX_aY_b(A)_nZ$$

wherein X is selected from the group consisting of fluorine, chlorine and bromine; Y is selected from the group consisting of hydrogen, fluorine, chlorine and bromine; $m$ is an integer from one to three; $a+b$ has a value equal to $2m$; Z is bromine and is a most electropositive atom; $n$ is an integer greater than one and not greater than one hundred; and each A is a monomer unit selected from the group consisting of an olefinic monomer containing fluorine and a cotelomerizable comonomer and in which at least one A is an olefin monomer containing fluorine.

26. A low molecular weight bromine- and fluorine-containing telomer having the general formula:

$$CFXY(A)_nZ$$

wherein X is selected from the group consisting of fluorine, chlorine and bromine; Y is selected from the group consisting of hydrogen, fluorine, chlorine and bromine; A is a perhaloolefin containing fluorine; $n$ represents the number of monomer units and is an integer between 6 and 50; and Z is bromine and is a most electropositive atom.

27. The telomer having the formula:

$$CF_2Cl(C_2F_3Cl)_nBr$$

wherein $n$ is greater than one and not greater than 100.

28. A new and novel telomer having the formula:

$$CF_2Br(C_2F_3Cl)_nBr$$

wherein $n$ is greater than one and not greater than 100.

29. A new and novel telomer having the formula:

$$CF_2Br(C_2F_4)_nBr$$

wherein $n$ is an integer having a value between 6 and 50.

30. A new and novel telomer having the formula:

$$CF_2Cl(C_2F_4)_nBr$$

wherein $n$ is an integer having a value between 6 and 50.

31. The new and novel low molecular weight bromineand fluorine-containing telomers having the general formula:

$$CFXY(A)_nZ$$

wherein X is selected from the group consisting of fluorine, chlorine and bromine; Y is selected from the group consisting of hydrogen, fluorine, chlorine and bromine; at least one A is an olefinic monomer containing fluorine and at least one A is a different cotelomerizable olefin; $n$ represents the total number of monomer units and is an integer greater than one and not greater than 100; and Z is bromine and is a most electropositive atom.

32. A new and novel telomer having the formula:

$$CF_2Cl(C_2F_3Cl \cdot C_2H_2Cl_2)_nBr$$

wherein $n$ is an integer having a value between 6 and 50.

33. A process for the production of fluorine-containing telomers containing a plurality of monomer units which comprises telomerizing a fluorine-containing olefin in the presence of a peroxy compound as a polymerization promoter and a fluorobromomethane.

34. A process which comprises telomerizing trifluorochloroethylene in the presence of benzoyl peroxide and difluorobromochloromethane.

35. A process which comprises telomerizing trifluorochloroethylene in the presence of benzoyl peroxide and difluorodibromomethane.

References Cited in the file of this patent

UNITED STATES PATENTS

| | | |
|---|---|---|
| 2,411,159 | Hanford | Nov. 19, 1946 |
| 2,440,800 | Hanford et al. | May 4, 1948 |
| 2,462,402 | Joyce | Feb. 22, 1949 |
| 2,551,639 | Feasley et al. | May 8, 1951 |
| 2,598,283 | Miller | May 27, 1952 |
| 2,662,065 | Berry | Dec. 8, 1953 |
| 2,689,872 | Denison et al. | Sept. 21, 1954 |